US011453443B2

(12) United States Patent
Moradnia et al.

(10) Patent No.: US 11,453,443 B2
(45) Date of Patent: Sep. 27, 2022

(54) A-PILLAR SURFACE OF A VEHICLE (71) Applicant: Honda Motor Co., Ltd., Tokyo (JP)

(72) Inventors: Pirooz Moradnia, Dublin, OH (US); Matthew L. Metka, Plain City, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/185,088

(22) Filed: Feb. 25, 2021

(65) Prior Publication Data
US 2022/0266916 A1    Aug. 25, 2022

(51) Int. Cl.
*B62D 25/04* (2006.01)
*B60R 13/07* (2006.01)
*B60R 13/04* (2006.01)

(52) U.S. Cl.
CPC .............. *B62D 25/04* (2013.01); *B60R 13/04* (2013.01)

(58) Field of Classification Search
CPC ........ B62D 25/04; B62D 25/07; B60J 7/0084; B60R 13/07
USPC ...................... 296/193.06, 180.1–180.5, 213
See application file for complete search history.

(56) References Cited

U.S. PATENT DOCUMENTS

| 5,118,157 | A | 6/1992 | Tamura |
| 6,899,376 | B1 | 5/2005 | Sullivan |
| 7,367,609 | B2 | 5/2008 | Grudzinski et al. |
| 8,146,979 | B2 | 4/2012 | Renke et al. |
| 8,454,083 | B2 | 6/2013 | Dimitriou et al. |
| 10,173,510 | B2 | 1/2019 | Vojtisek et al. |
| 10,449,912 | B2 | 10/2019 | Okabe et al. |
| 10,589,610 | B2 | 3/2020 | Takashi |
| 10,597,088 | B2 * | 3/2020 | Gulker ........................ B60J 1/02 |

(Continued)

FOREIGN PATENT DOCUMENTS

DE    3119358    12/1982
DE    3936372    5/1991
(Continued)

OTHER PUBLICATIONS

EZE-RV Gutter System—10' Package, Ultra White|Camping World, date printed May 4, 2020, https://www.campingworld.com/eze-rv-gutter-system10%27-package—ultra-white-16962.html.
(Continued)

*Primary Examiner* — Dennis H Pedder
(74) *Attorney, Agent, or Firm* — Rankin, Hill & Clark LLP (57) ABSTRACT

An A-pillar surface of a vehicle, the A-pillar surface includes a cover disposed over an A-pillar such that the cover at least partially forms an exterior surface of the vehicle and defines an airflow path along the exterior surface of the vehicle at a location that is interposed between and separates a windshield and a side window of the vehicle, where the airflow path flows along the windshield toward the side window, over the cover. The cover forms a gutter surface disposed along the windshield and recessed from the airflow path into the exterior surface of the vehicle such that the gutter surface is configured to separate the airflow path from the exterior surface of the vehicle and collect liquid traveling with the airflow path from the windshield to the side window. The cover forms a flow re-attachment surface disposed along the side window to partially define the airflow path.

19 Claims, 5 Drawing Sheets

(56) References Cited

U.S. PATENT DOCUMENTS

2010/0320796 A1    12/2010   Hoefer et al.
2016/0129771 A1     5/2016   Nakai et al.

FOREIGN PATENT DOCUMENTS

| | | | |
|---|---|---|---|
| DE | 4307303 | | 9/1994 |
| DE | 19960144 | * | 6/2001 |
| DE | 102004042703 | | 3/2006 |
| DE | 19907390 | | 8/2008 |
| DE | 102009009469 | | 8/2010 |
| DE | 102012221993 | | 6/2014 |
| DE | 102012221994 | | 6/2014 |
| DE | 102012221995 | | 6/2014 |
| DE | 102014017103 | | 5/2016 |
| EP | 0952018 | | 10/1999 |
| EP | 2353903 | | 8/2011 |
| EP | 2429862 | | 3/2012 |
| JP | H11334358 | | 12/1999 |
| JP | 2010058656 | | 3/2010 |
| KR | 19980010798 | | 5/1998 |
| KR | 200145667 | | 6/1999 |
| KR | 10-0291061 | | 6/2001 |
| KR | 100494729 | | 6/2005 |
| KR | 101324324 | | 11/2013 |
| KR | 20140029802 | | 3/2014 |

OTHER PUBLICATIONS

National Guard, Dark Bronze Rain Drip Guard, Flange Height 5/8", Projection 2-1/2", Length 76", date printed May 4, 2020, https://www.grainger.com/product/NATIONAL-GUARD-Dark-Bronze-Rain-Drip-Guard-45AA36.

* cited by examiner

A-PILLAR SURFACE OF A VEHICLE

BACKGROUND

For improved performance and efficiency, vehicles are incentivized to adopt aerodynamic shapes featuring a smooth exterior surface, including the exterior surface between a windshield and side windows. For improved driver visibility through side windows in raining weather conditions, vehicles are also incentivized to adopt elements such as gutter channels interposed between the windshield and the side windows along the exterior surface. Gutter channels interposed between the windshield and a side window are configured for preventing rain from sliding across the exterior surface of the vehicle, from the windshield to the side window according to a headwind of the vehicle when the vehicle is being driven.

Known gutter channels are formed from static incongruities in paneling along the exterior surface of the vehicle to catch rain water between the windshield and a window, and guide the caught rain water over a top of the vehicle using the headwind of the vehicle. While known gutter channels may successfully prevent rain on the front of the vehicle from sliding to the side windows in raining weather conditions, the static incongruities forming the gutter channels disrupt the otherwise smooth exterior surface and reduce an aerodynamic aspect thereof, even when the vehicle is driven outside raining weather conditions. Accordingly, a current challenge in known vehicle designs is providing a smooth, aerodynamic exterior surface when the vehicle is being driven outside raining weather conditions, and providing functional gutter channels when the vehicle is being driven in raining weather conditions.

BRIEF DESCRIPTION

According to one aspect, an A-pillar surface of a vehicle, the A-pillar surface includes a cover disposed over an A-pillar such that the cover at least partially forms an exterior surface of the vehicle and defines an airflow path along the exterior surface of the vehicle at a location that is interposed between and separates a windshield and a side window of the vehicle. The cover forms a flow re-attachment surface disposed along the side window to partially define the airflow path, and a gutter surface disposed along the windshield and recessed from the airflow path and into the exterior surface of the vehicle between the windshield and the flow re-attachment surface at the exterior surface of the vehicle such that the gutter surface is configured to collect liquid traveling with the airflow path from the windshield to the side window.

According to another aspect, an A-pillar surface of a vehicle includes a cover disposed over an A-pillar such that the cover at least partially forms an exterior surface of the vehicle with a windshield and a side window at a location that is interposed between and separates the windshield and the side window along the exterior surface of the vehicle, the cover being elastically deformable between an inflated position and a deflated position. When the cover is in the inflated position, the exterior surface of the vehicle formed from the cover substantially conforms to the exterior surface of the vehicle formed from the windshield and the side window such that an airflow path is attached to the exterior surface of the vehicle from the windshield to the side window across the cover. When the cover is in the deflated position, the cover forms a gutter surface and a flow re-attachment surface such that the gutter surface is disposed along the windshield, between the windshield and the flow re-attachment surface in the lateral direction of the vehicle, the gutter surface being configured to separate the airflow path from the exterior surface of the vehicle and collect liquid traveling with the airflow path between the windshield and the side window, and such that the flow re-attachment surface is disposed along the side window, between the gutter surface and the side window along the exterior surface of the vehicle, and the flow re-attachment surface is positioned to receive the airflow path such that the airflow path attaches to the exterior surface of the vehicle at the flow re-attachment surface.

According to another aspect, a method of operating an A-pillar surface of a vehicle includes elastically deforming a cover to a deflated position in response to one of a user command and a sensor input indicating liquid on a windshield, the cover being disposed over an A-pillar such that the cover at least partially forms an exterior surface of the vehicle with the windshield and a side window at a location that is interposed between and separates the windshield and the side window in a lateral direction of the vehicle, with a first lateral side of the cover located closer to the side window as compared to the windshield and a second lateral side of the cover located closer to the windshield as compared to the side window. When the cover is in the deflated position the cover forms a gutter surface in the second lateral side of the cover and a flow re-attachment surface on the first lateral side of the cover such that the gutter surface separates an airflow path from the exterior surface of the vehicle and collects liquid traveling with the airflow path between the windshield and the side window in the lateral direction of the vehicle, the gutter surface being disposed along the windshield, between the windshield and the flow re-attachment surface in the lateral direction of the vehicle, and such that the flow re-attachment surface is positioned to receive the airflow path such that the airflow path attaches to the exterior surface of the vehicle at the flow re-attachment surface, the flow re-attachment surface being disposed along the side window, between the gutter surface and the side window in the lateral direction of the vehicle.

DETAILED DESCRIPTION

Figure 1:
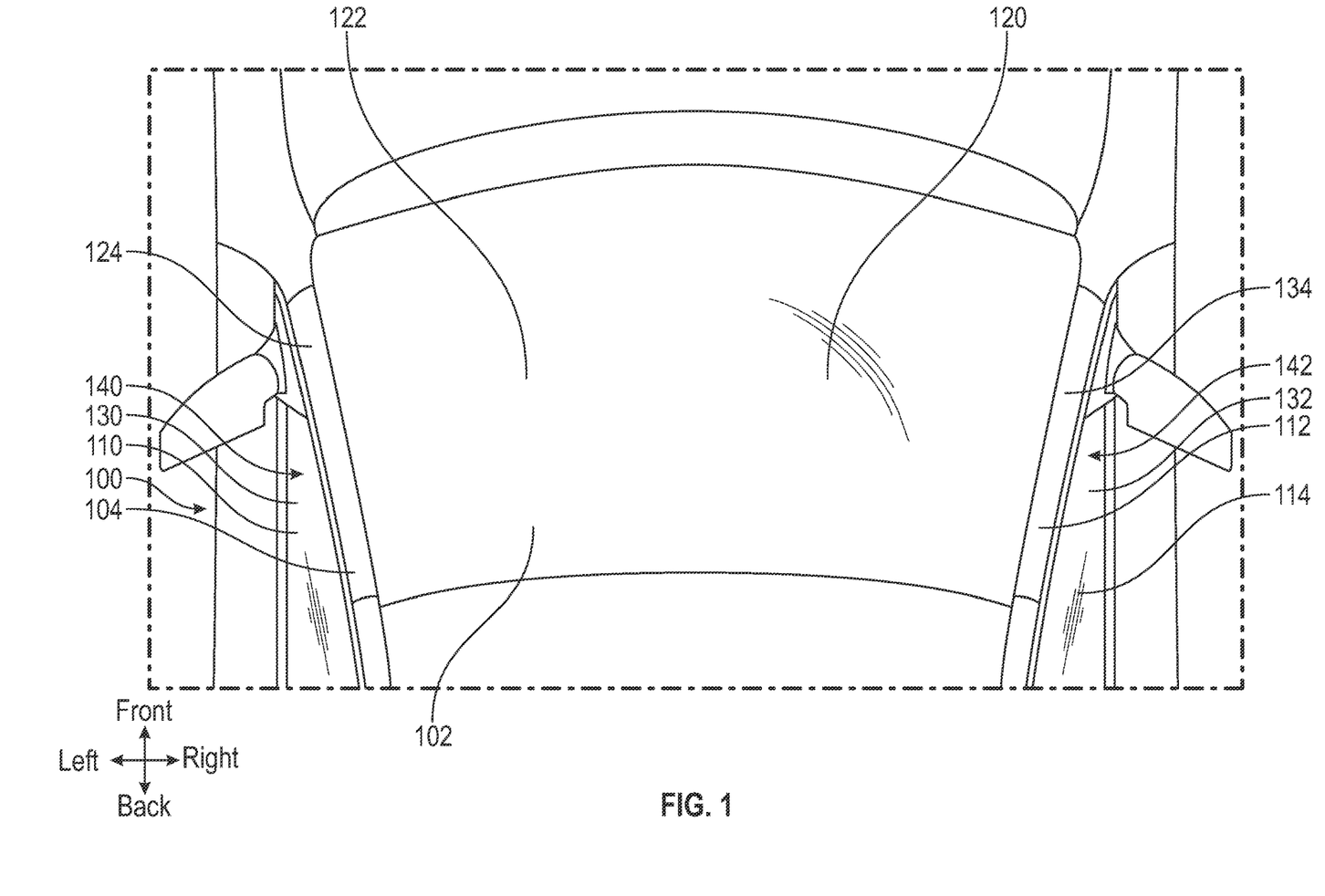
FIG. 1 is a top partial view of a vehicle including a first gutter surface assembly and a second gutter surface assembly.

It should, of course, be understood that the description and drawings herein are merely illustrative and that various modifications and changes can be made in the structures disclosed without departing from the present disclosure. Referring now to the drawings, wherein like numerals refer to like parts throughout the several views, FIG. 1 depicts a vehicle 100 including a windshield 102, a first A-pillar 104, a first side window 110, a second A-pillar 112, and a second side window 114. The first A-pillar 104 is interposed between and separates the windshield 102 from the first side window 110 in a lateral direction of the vehicle 100, specifically in a right-left direction of the vehicle 100 such that an exterior surface 120 of the vehicle 100 includes an exterior surface 122 of the windshield 102, an exterior surface 124 of the first A-pillar 104, and an exterior surface 130 of the first side window 110 along the right-left direction of the vehicle 100. As depicted, the exterior surface 124 of the first A-pillar 104 is substantially flush with the exterior surface 122 of the windshield 102 and the exterior surface 130 of the first side window 110 such that an aerodynamic curve of the exterior surface 120 of the vehicle 100 is substantially continuous from the exterior surface 122 of the windshield 102 to the exterior surface 130 of the first side window 110 across the exterior surface 124 of the first A-pillar 104.

The second A-pillar 112 features a construction similar to the first A-pillar 104, where the second A-pillar 112 is interposed between and separates the windshield 102 from the second side window 114 along the exterior surface 120 of the vehicle 100 in the lateral direction of the vehicle 100, specifically a left-right direction of the vehicle 100 such that the exterior surface 120 of the vehicle 100 includes an exterior surface 132 of the second side window 114, an exterior surface 134 of the second A-pillar 112, and the exterior surface 122 of the windshield 102 along the left-right direction of the vehicle 100. As depicted, the exterior surface 134 of the second A-pillar 112 is substantially flush with the exterior surface 122 of the windshield 102 and the exterior surface 132 of the second side window 114 such that an aerodynamic curve of the exterior surface 120 of the vehicle 100 is substantially continuous from the exterior surface 122 of the windshield 102 to the exterior surface 130 of the first side window 110 across the exterior surface 134 of the second A-pillar 112.

The windshield 102 is interposed between and separates the first A-pillar 104 and the second A-pillar 112 in the lateral direction of the vehicle 100, and the exterior surface 122 of the windshield 102 is continuous between the first A-pillar 104 and the second A-pillar 112 in the lateral direction of the vehicle 100. As such, an aerodynamic curve of the exterior surface 120 of the vehicle 100 is substantially continuous from the exterior surface 124 of the first A-pillar 104 to the exterior surface 134 of the second A-pillar 112 across the windshield 102 in the lateral direction of the vehicle 100, and is further substantially continuous from the exterior surface 130 of the first side window 110 to the exterior surface 132 of the second side window 114 across the exterior surface 124 of the first A-pillar 104, the exterior surface 122 of the windshield 102, and the exterior surface 134 of the second A-pillar 112 in the lateral direction of the vehicle 100.

A first gutter surface assembly 140 is disposed in the first A-pillar 104 and at least partially forms the exterior surface 124 of the first A-pillar 104. A second gutter surface assembly 142 has a construction similar to the first gutter surface assembly 140 and has an orientation opposite from the first gutter surface assembly 140 with respect to the lateral direction of the vehicle 100. To this end, the second gutter surface assembly 142 is disposed in the second A-pillar 112 and at least partially forms the exterior surface 134 of the second A-pillar 112. Further, unless otherwise stated, the following description made with reference to the first gutter surface assembly 140 is similarly applicable to the second gutter surface assembly 142.

Figure 2:
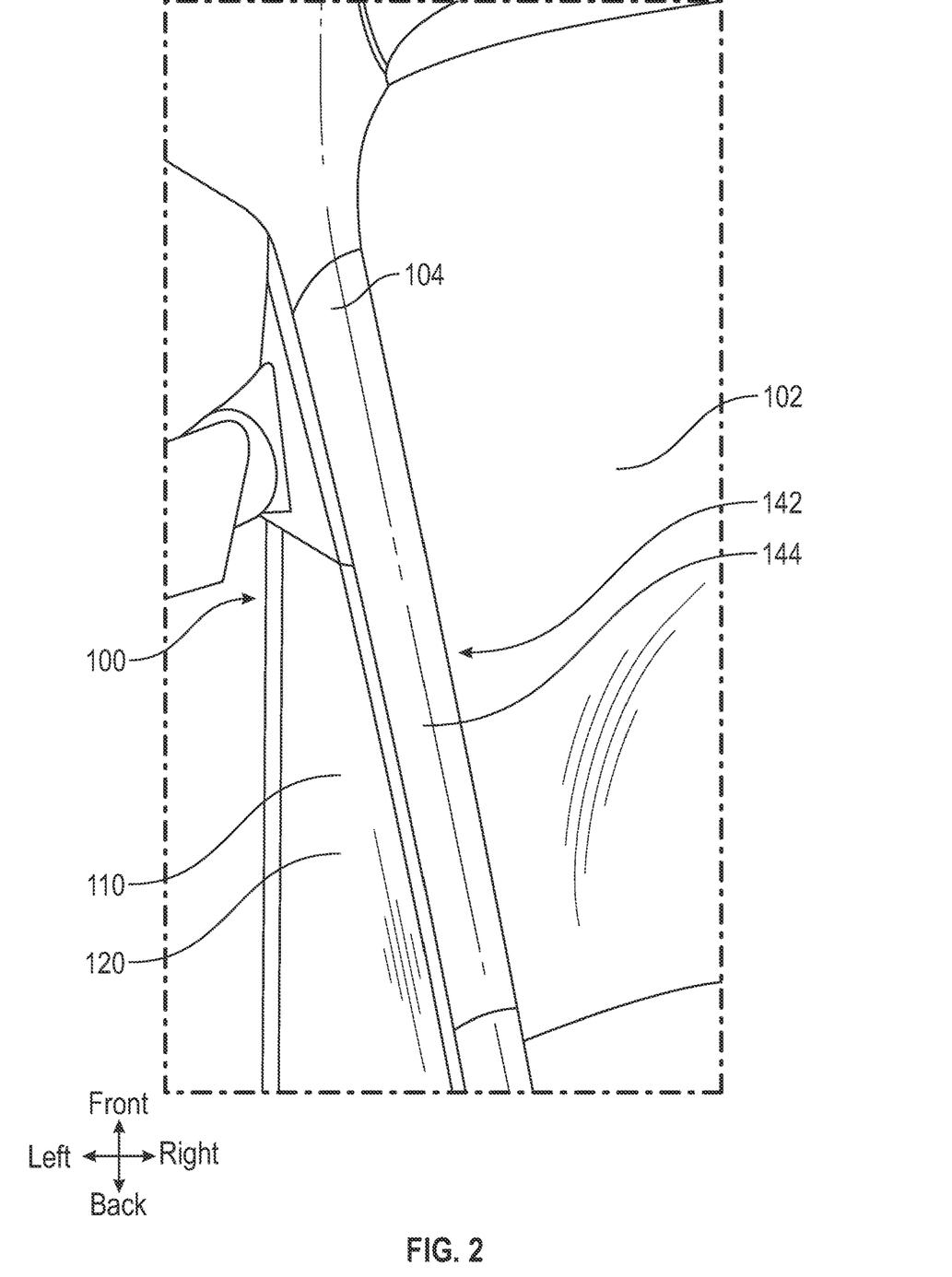
FIG. 2 is a top view of the first gutter surface assembly.

As depicted in FIG. 2, the first gutter surface assembly 140 includes a cover 144 disposed over the first A-pillar 104 such that the cover 144 at least partially forms the exterior surface 120 of the vehicle 100 and defines an airflow path along the exterior surface 120 of the vehicle 100 with the windshield 102 and the first side window 110 at a location that is interposed between and separates the windshield 102 and the first side window 110 along the exterior surface 120 of the vehicle 100 in the right-left direction of the vehicle 100. In this manner, the exterior surface 120 of the vehicle 100 is at least partially formed by the windshield 102, the cover 144, and the first side window 110 in the right-left direction of the vehicle 100.

Figure 3:
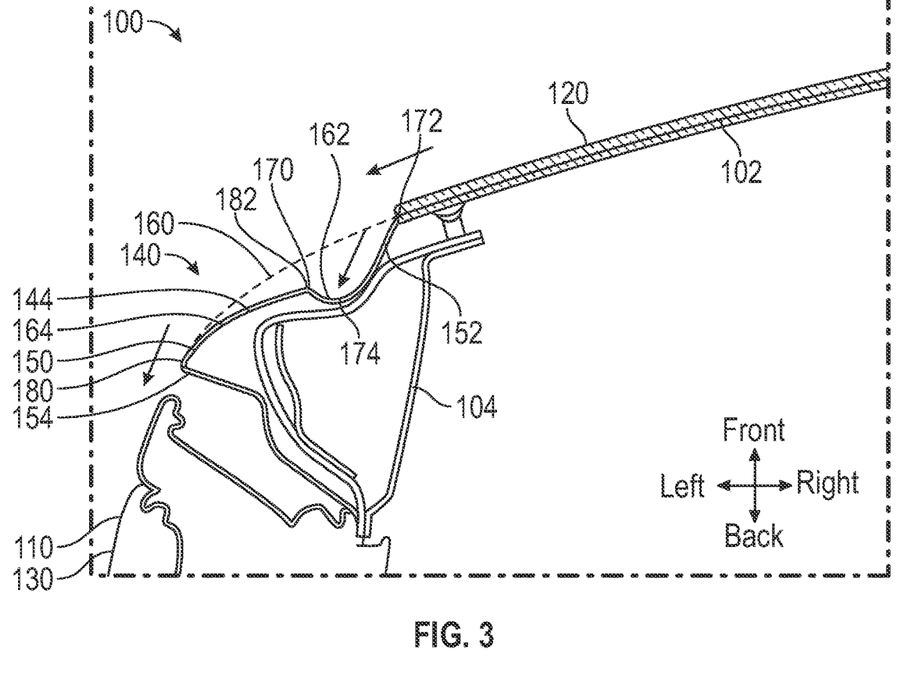
FIG. 3 is a cross-sectional view of the first gutter surface assembly.

FIG. 3 depicts a cross-sectional view of the first gutter surface assembly 140 taken along a longitudinal direction of the first A-pillar 104, in a back-front direction of the vehicle 100. The cover 144 is formed from a panel, and is a static structure configured to separate airflow including the airflow path from the exterior surface 120 of the vehicle 100, collect liquid such as rain water traveling with the airflow path across the exterior surface 120 of the vehicle 100 in the right-left direction of the vehicle 100, and re-attach the airflow path with the exterior surface 120 of the vehicle 100 between the windshield 102 and the first side window 110 in the right-left direction of the vehicle 100. As shown in FIG. 3, the airflow path is a headwind of the vehicle 100 traveling from the windshield 102 to the first side window 110 around the first gutter surface assembly 140 with respect to a front-back direction of the vehicle 100 and the left-right direction of the vehicle 100.

A first lateral side 150 of the cover 144, depicted as a left side of the cover 144 in the lateral direction of the vehicle 100, is located closer to the first side window 110 as compared to the windshield 102, and a second lateral side 152 of the cover 144, depicted as a right side of the cover 144 in the lateral direction of the vehicle 100, is located closer to the windshield 102 as compared to the first side window 110. The first lateral side 150 of the cover 144 is fixed to a lateral side 154 of the first A-pillar 104, depicted as a left side of the first A-pillar 104 in the lateral direction of the vehicle 100, the lateral side 154 of the first A-pillar 104 being located closer to the first side window 110 as compared to the windshield 102. As depicted, the second lateral side 152 of the cover 144 is fixed directly to the windshield 102 such that the cover 144 continues the exterior surface 120 of the vehicle 100 from the windshield 102 to the lateral side 154 of the first A-pillar 104, along the second lateral side 152 of the cover 144 to the first lateral side 150 of the cover 144.

The exterior surface 120 of the vehicle 100 formed from the exterior surface 122 of the windshield 102 and the exterior surface 130 of the first side window 110 substantially defines the airflow path and conforms to an aerodynamic shape 160 configured to facilitate and maintain attachment of the airflow path to the exterior surface 120 of the vehicle 100. In this manner, the exterior surface 122 of the windshield 102 and the exterior surface 130 of the first side window 110 are configured to facilitate and maintain attachment with the wind. Notably, while substantial conformance of the exterior surface 120 of the vehicle 100 to the aerodynamic shape 160 facilitates and maintains attachment of the airflow path to the exterior surface 120 of the vehicle 100, a substantial deviation of the exterior surface 120 of the vehicle 100 from the aerodynamic shape 160 causes the airflow path to separate from the exterior surface 120 of the vehicle 100.

The cover 144 forms a gutter surface 162 and a flow re-attachment surface 164 disposed along the first A-pillar 104 between the windshield 102 and the first side window 110 to partially define the airflow path. The gutter surface 162 is disposed along the windshield 102, between the windshield 102 and the flow re-attachment surface 164 at the exterior surface 120 of the vehicle 100. The airflow path flows along the windshield 102 toward the first side window 110, over the cover 144, where the gutter surface 162 is recessed from the airflow path into the exterior surface 120 of the vehicle 100 such that the gutter surface 162 is configured to separate the airflow path from the exterior surface 120 of the vehicle 100, and is configured to collect liquid traveling with the airflow path along the right-left direction of the vehicle 100 from the windshield 102 to the first side window 110 before the airflow path or the liquid reaches the flow re-attachment surface 164. In this manner, the gutter surface 162 causes a local airflow separation at the exterior surface 120 of the vehicle 100 and collects liquid, including liquid droplets, traveling with the local airflow.

The gutter surface 162 is disposed along the windshield 102 between the windshield 102 and the flow re-attachment surface 164 in the right-left direction of the vehicle 100. More specifically, the gutter surface 162 is formed in the second lateral side 152 of the cover 144 between the windshield 102 and the flow re-attachment surface 164 in the right-left direction of the vehicle 100.

The flow re-attachment surface 164 is configured to re-attach the airflow path to the exterior surface 120 of the vehicle 100, and is disposed along the first side window 110, between the gutter surface 162 and the first side window 110 in the right-left direction of the vehicle 100. More specifically, the gutter surface 162 is formed in the first lateral side 150 of the cover 144 between the gutter surface 162 and the flow re-attachment surface 164 in the right-left direction of the vehicle 100.

The gutter surface 162 defines a concavity that substantially deviates the exterior surface 120 of the vehicle 100 inward of the aerodynamic shape 160 such that the exterior surface 120 of the vehicle 100 is configured to separate the airflow path from the exterior surface 120 of the vehicle 100. In this manner, the gutter surface 162 is configured to separate the airflow path from the exterior surface 120 of the vehicle 100 in front of the flow re-attachment surface 164 with respect to flow of the airflow path in the right-left direction of the vehicle 100.

The gutter surface 162 includes a first lateral end 170 and a second lateral end 172. The first lateral end 170 of the gutter surface 162 is located closer to the flow re-attachment surface 164 and the first side window 110 as compared to the windshield 102. The second lateral end 172 of the gutter surface 162 is a lateral end of the cover 144 and is located closer to the windshield 102 as compared to the first side window 110. The gutter surface 162 includes a medial portion 174 that is interposed between and separates the first lateral end 170 of the gutter surface 162 and the second lateral end 172 of the gutter surface 162 in the left-right direction of the vehicle 100.

The first lateral end 170 of the gutter surface 162 and the second lateral end 172 of the gutter surface 162 extend the exterior surface 120 of the vehicle 100 outward in a direction substantially perpendicular to the length of the first A-pillar 104, beyond the medial portion 174 of the gutter surface 162. When the airflow path is separated from the exterior surface 120 of the vehicle 100 at the gutter surface 162, liquid traveling with the airflow path across the exterior surface 120 of the vehicle 100 is unable to follow the airflow path over the concavity defined by the gutter surface 162 and instead collects in the gutter surface 162, at the medial portion 174 between the first lateral end 170 of the gutter surface 162 and the second lateral end 172 of the gutter surface 162.

The flow re-attachment surface 164 is configured to re-attach the airflow path to the exterior surface 120 of the vehicle 100 after the airflow path flows past the first lateral end 170 of the gutter surface 162. To this end, the flow re-attachment surface 164 includes a first lateral end 180 and a second lateral end 182. The first lateral end 180 of the flow re-attachment surface 164 is a lateral end of the cover 144 and is located closer to the first side window 110 as compared to the gutter surface 162. The second lateral end 182 of the flow re-attachment surface 164 is located closer to the gutter surface 162 as compared to the first side window 110.

The first lateral end 180 of the flow re-attachment surface 164 is connected to the lateral side 154 of the first A-pillar 104 at a location and with a geometry that substantially conforms to the aerodynamic shape 160. With this, at least a portion of the flow re-attachment surface 164 at the first lateral end 180 of the flow re-attachment surface 164 substantially conforms to the aerodynamic shape 160, and substantially conforms to the exterior surface 120 of the vehicle 100 at the first side window 110 such that the flow re-attachment surface 164 is positioned to receive the airflow path and the airflow path is re-attached to the exterior surface 120 of the vehicle 100 at the flow re-attachment surface 164. The second lateral end 182 of the flow re-attachment surface 164 transitions to the first lateral end 170 of the gutter surface 162 at a location recessed inward from the aerodynamic shape 160. With this, at least a portion of the flow re-attachment surface 164 at the second lateral end 182 of the flow re-attachment surface 164 is recessed inward from the aerodynamic shape 160. In this manner, the flow re-attachment surface 164 forms a transition in the exterior surface 120 of the vehicle 100 from a location and geometry that substantially conform to the aerodynamic shape 160 at the first lateral end 180 of the flow re-attachment surface 164, to a location and geometry that substantially deviate from the aerodynamic shape 160 at the second lateral end 182 of the flow re-attachment surface 164. As such, the flow re-attachment surface 164 is configured to re-attach the airflow path to the exterior surface 120 of the vehicle 100.

Figure 4:
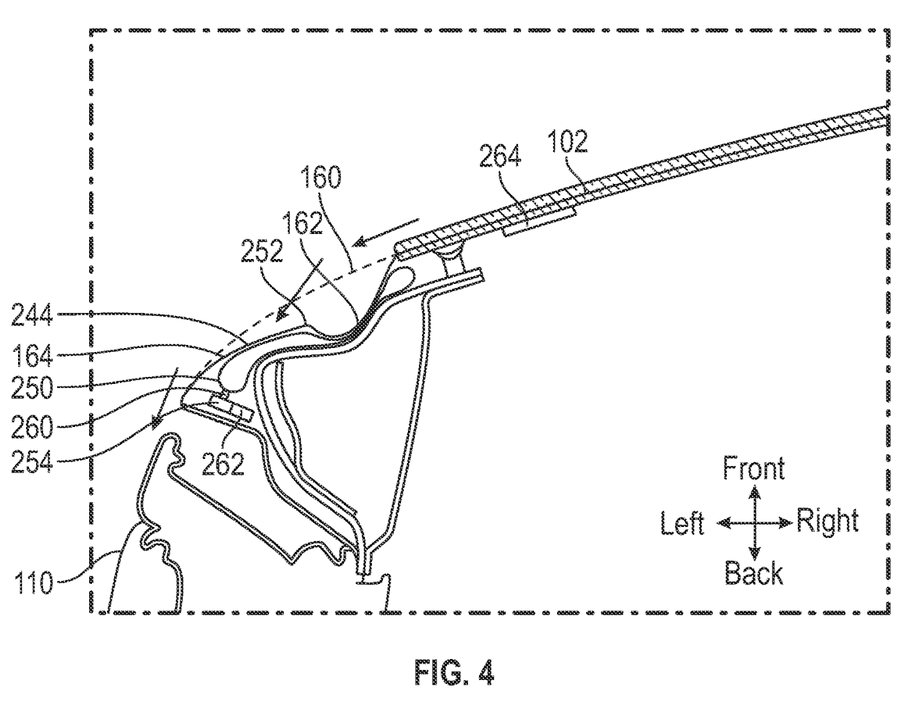
FIG. 4 is a cross-sectional view of an embodiment of the first gutter surface assembly featuring an elastically deformable cover in a deflated position.

In an alternative embodiment, a cover disposed over the first A-pillar 104 is elastically deformable between a deflated position and an inflated position. To this end, FIG. 4 depicts a cover 244 in a deflated position where the cover 244 includes the gutter surface 162 and the flow re-attachment surface 164 positioned together between the windshield 102 and the first side window 110 in the right-left direction of the vehicle 100. Unless otherwise stated, the cover 244 operates in a similar manner as described with reference to the cover 144, and has similar features as the cover 144.

As shown, the cover 244 is supported by a bladder 250 disposed in the first A-pillar 104 between the windshield 102 and the first side window 110 in the right-left direction of the vehicle 100, and under the cover 244 with respect to the exterior surface 120 of the vehicle 100. The bladder 250 is configured for being inflated to support the cover 244 in the inflated position, and the bladder 250 is configured for being deflated to retract the cover 244 inward with respect to the exterior surface 120 of the vehicle 100 toward the deflated position from the inflated position, and support the cover 244 in the retracted position.

A molded shape and material thickness of the cover 244 define a living hinge 252 in the cover 244 located between and connecting the gutter surface 162 and the flow re-attachment surface 164 when the cover 244 is in the deflated position. The living hinge 252 is bent inward along the exterior surface 120 of the vehicle 100 in the left-right direction of the vehicle 100, between the gutter surface 162 and the flow re-attachment surface 164, to form the concavity defined in the gutter surface 162.

The bladder 250 is inflated and deflated by an air pump 254 and a valve 260 actuated by a controller 262. As depicted, the air pump 254, the valve 260, and the controller 262 are located in the first A-pillar 104, however, in an alternative embodiment, the air pump 254 may be located in an engine room (not shown) of the vehicle 100 and connected to the bladder 250 in the first A-pillar 104 via a hose system. Notably, each of the air pump 254, the valve 260, and the controller 262 may be alternatively located elsewhere in the vehicle, including at locations remote from the bladder 250 and the first A-pillar 104, without departing from the scope of the present disclosure. Furthermore, the controller 262 may be part of an electronic control unit (ECU) associated with the vehicle 100.

The controller 262 is configured to actuate the air pump 254 and the valve 260 to cause the cover 244 to elastically deform in response to at least one of a user command and input from a sensor 264 disposed on the windshield 102. The sensor 264 is configured to detect liquid on the windshield 102, and input from the sensor 264 to the controller 262 corresponds with at least one of no liquid, no more than a nominal amount of liquid, and liquid in excess of the nominal amount detected on the windshield 102 by the sensor 264. A nominal amount of liquid detected on the windshield 102 by the sensor 264, carried by the airflow path across the exterior surface 120 of the vehicle 100 from the windshield 102 to the first A-pillar 104, results in an amount of liquid collected by the gutter surface 162 without any of the liquid overflowing from the gutter surface 162 to the flow re-attachment surface 164 and the first side window 110. Conversely, an amount of liquid in excess of the nominal amount of liquid detected on the windshield 102 by the sensor 264, carried by the airflow path across the exterior surface 120 of the vehicle 100, results in an amount of liquid collected by the gutter surface 162 overflowing from the gutter surface 162 to the flow re-attachment surface 164 and the first side window 110.

A deflated condition of the bladder 250 corresponding with the deflated position of the cover 244 is a nominal low pressure condition of the bladder 250. The controller 262 is configured to actuate the air pump 254 and the valve 260 to bring the bladder 250 into the deflated condition when input from the sensor 264 to the controller 262 corresponds with no liquid, or no more than a nominal amount of liquid on the windshield 102. An inflated condition of the bladder 250 corresponding with the inflated position of the cover 244 is a high pressure condition relative to the deflated condition, and corresponds with liquid in excess of the nominal amount detected on the windshield 102 by the sensor 264.

Figure 5:
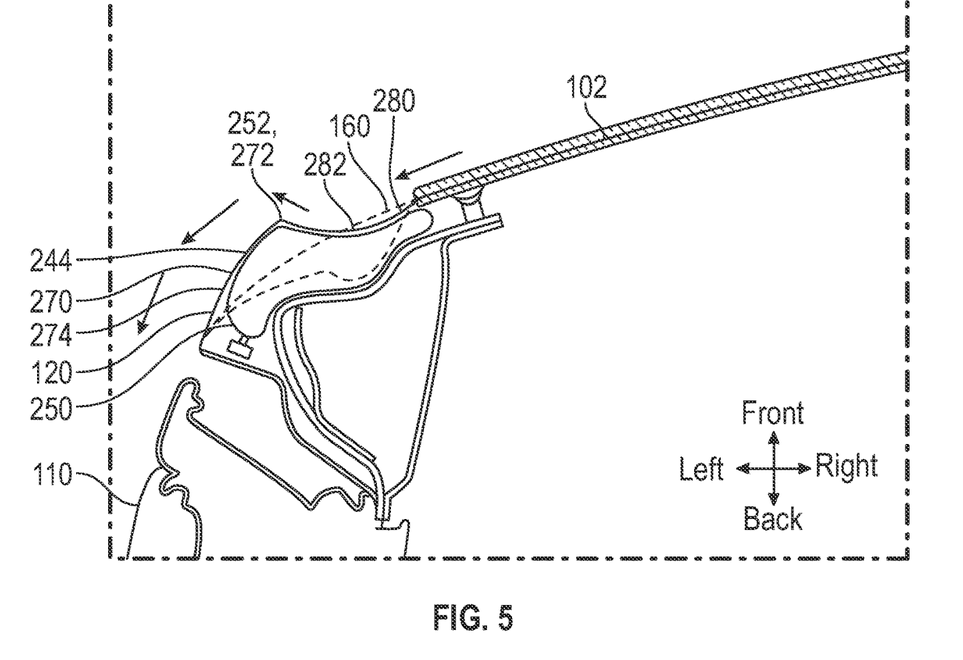
FIG. 5 is a cross-sectional view of the embodiment of the first gutter surface assembly of FIG. 4 depicting the cover in an inflated position.

FIG. 5 depicts the cover 244 in the inflated position, with the bladder 250 in an inflated condition. As depicted, when the cover 244 is in the inflated position, the cover 244 forms a contour 270 disposed along the windshield 102, between the windshield 102 and the first side window 110 in the right-left direction of the vehicle 100. The contour 270 is configured to separate the airflow path from the exterior surface 120 of the vehicle 100 before the airflow path reaches the first side window 110 such that the airflow path deflects liquid traveling with the airflow path away from the first side window 110 in the right-left direction of the vehicle 100.

As shown, the contour 270 includes a ridge 272 formed from a first lateral side 274 of the cover 244 positioned along the first side window 110, and a second lateral side 280 of the cover 244 positioned along the windshield 102. The first lateral side 274 of the cover 244 and the second lateral side 280 of the cover 244 are disposed between the windshield 102 and the first side window 110 in the right-left direction of the vehicle 100. The first lateral side 274 of the cover 244 forms a convex contour along the exterior surface 120 of the vehicle 100. The second lateral side 280 of the cover 244 at the windshield 102 is fixed directly to the windshield 102 such that the second lateral side 280 of the cover 244 at the windshield 102 is tangent to the windshield 102 along the aerodynamic shape 160, including when the cover 244 is in the deflated position and the inflated position.

The contour 270 also includes a recess 282 formed from the second lateral side 280 of the cover 244 along the windshield 102, between the second lateral side 280 of the cover 244 at the windshield 102 and the ridge 272 in the right-left direction of the vehicle 100 such that the contour 270 substantially deviates inward from the aerodynamic shape 160 along the second lateral side 280 of the cover 244. The ridge 272 is more specifically formed between the recess 282 and the first side window 110 in the right-left direction of the vehicle 100.

In an alternative embodiment, the second lateral side 280 of the cover 244 forms a straight ramp instead of a recess, where the straight ramp extends between the living hinge 252 and the windshield 102 and is configured to deflect the airflow path from the exterior surface 120 of the vehicle 100 at the living hinge 252. In a further alternative embodiment, material forming the second lateral side 280 of the cover 244 is stretched and held taught between the living hinge 252 and the windshield 102 to form the straight ramp. While the depicted cover 244 is supported in the inflated position by the bladder 250 to form the contour 270 including the recess 282 when the bladder 250 is in the inflated condition, and the inflated condition of the bladder 250 is a high pressure condition relative to the deflated condition, the cover 244 may be alternatively configured to form the contour 270 including the recess 282 when the bladder 250 is in the deflated condition, which is a low pressure condition relative to the inflated condition.

The exterior surface 120 of the vehicle 100 is extended outward at the ridge 272, outside the aerodynamic shape 160, such that the contour 270 substantially deviates outward from the exterior surface 120 of the vehicle 100 at the windshield 102 and the first side window 110, including the exterior surface 122 of the windshield 102 and the exterior surface 130 of the first side window 110. In this manner, the contour 270 deviates outward from the aerodynamic shape 160 at the first lateral side 274 of the cover 244 and the ridge 272 is configured to separate the airflow path from the exterior surface 120 of vehicle 100.

The living hinge 252 is located between and connects the gutter surface 162 and the flow re-attachment surface 164 when the cover 244 is in the deflated position, and at least partially forms the ridge 272 when the cover 244 is in the inflated position. When the bladder 250 is inflated from the deflated condition to the inflated condition, the exterior surface 120 of the vehicle 100 formed from the gutter surface 162 expands to define the recess 282, while the second lateral end 182 of the flow re-attachment surface 164 and the first lateral end 170 of the gutter surface 162 form the ridge 272 of the contour 270 at the living hinge 252.

With this construction, when the airflow path passes over the contour 270 in the right-left direction of the vehicle 100, the airflow path is directed inward along the recess 282 and then outward over the ridge 272, away from the first lateral side 150 of the cover 244 and the first side window 110. The exterior surface 120 of the vehicle 100 along the contour 270 changes too abruptly at the ridge 272 as the airflow path passes over the cover 244 in the right-left direction of the vehicle 100 for the airflow path to remain attached to the exterior surface 120 of the vehicle 100 after passing over the ridge 272. In this manner, the contour 270 is configured to separate the airflow path from the exterior surface 120 of the vehicle 100, including the first side window 110. Similarly, liquid carried by the airflow path over and across the exterior surface 120 of the vehicle 100 is directed away from the exterior surface 120 of the vehicle 100, including the first side window 110, preventing the liquid from contacting the first side window 110.

Figure 6:
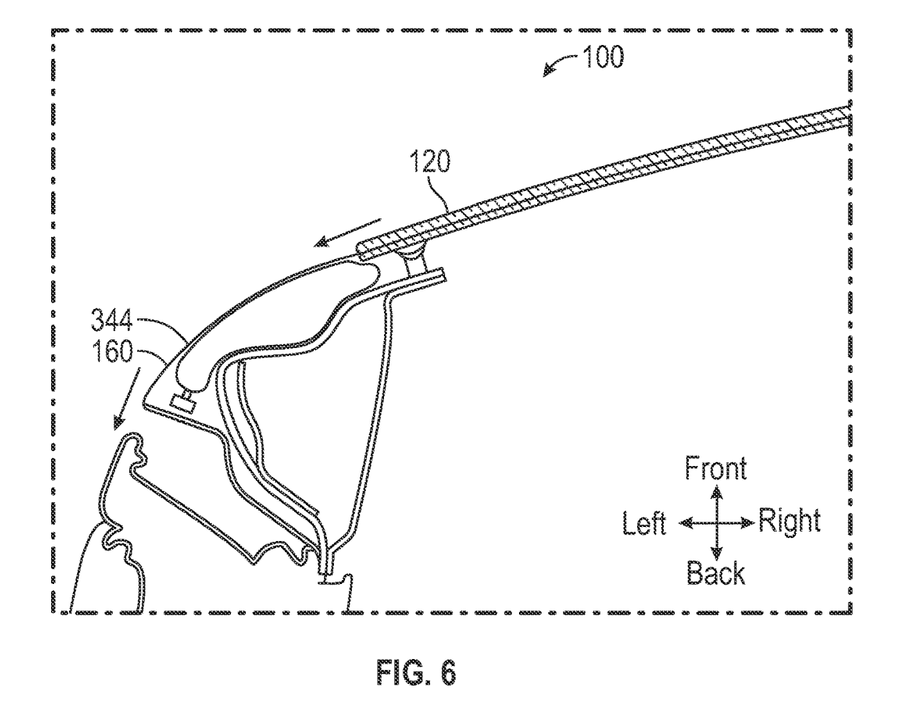
FIG. 6 is a cross-sectional view of an embodiment of the first gutter surface assembly featuring an elastically deformable cover in an inflated position.

In an alternative embodiment, a cover disposed over the first A-pillar 104 is supported in an inflated position such that the exterior surface 120 of the vehicle 100 at the cover substantially conforms to the aerodynamic shape 160. To this end, FIG. 6 depicts a cover 344 where, when the cover 344 is in an inflated position, the exterior surface 120 of the vehicle 100 formed from the cover 344 substantially conforms to the aerodynamic shape 160 of the vehicle 100 in accordance with the airflow path of the vehicle 100, and substantially conforms to the exterior surface 120 of the vehicle 100 formed from the windshield 102 and the first side window 110 to maintain attachment with the airflow path such that the airflow path is attached to the exterior surface 120 of the vehicle 100 from the windshield 102 to the first side window 110 across the cover 344 in the right-left direction of the vehicle 100. Unless otherwise stated, the cover 344 operates in a similar manner as described with reference to the cover 244, and has similar features as the cover 144 and the cover 244.

Figure 7:
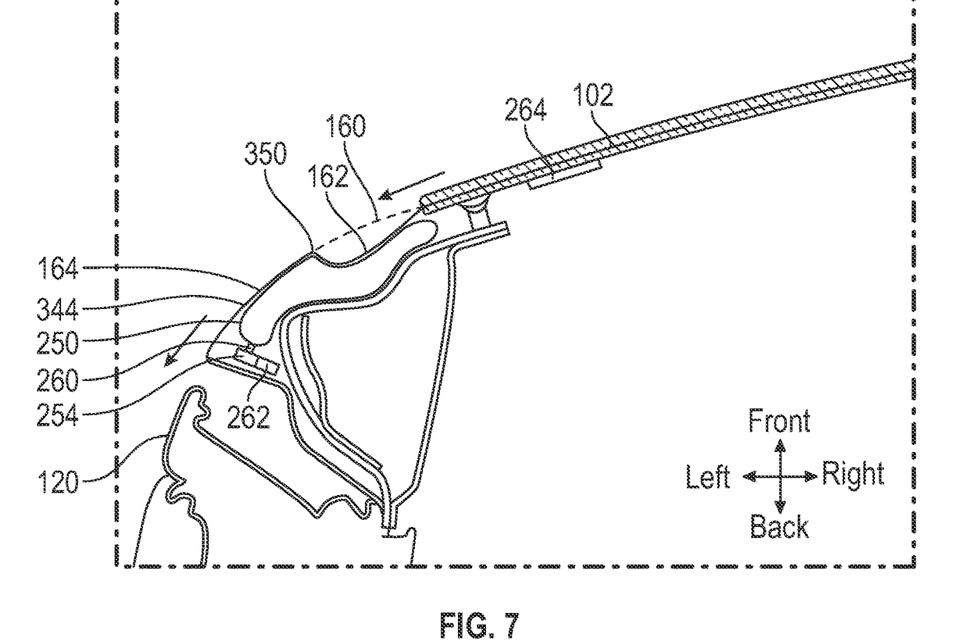
FIG. 7 is a cross-sectional view of the embodiment of the first gutter surface assembly of FIG. 6 depicting the cover in a deflated position.

As depicted in FIG. 7, when the cover 344 is in the deflated position, the cover 344 forms the gutter surface 162 and the flow re-attachment surface 164. A molded shape and material thickness of the cover 344 define a living hinge 350 in the cover 344 located between and connecting the gutter surface 162 and the flow re-attachment surface 164. The living hinge 350 is bent inward along the exterior surface 120 of the vehicle 100 in the left-right direction of the vehicle 100, between the gutter surface 162 and the flow re-attachment surface 164, to form a deflected shape at the second lateral end 172 of the gutter surface 162, defining the concavity of the gutter surface 162.

The controller 262 is configured to actuate the air pump 254 and the valve 260 to cause the cover 344 to elastically deform in response to at least one of a user command and input from the sensor 264, where the sensor 264 is configured to detect liquid on the windshield 102 and input from the sensor 264 to the controller 262 corresponds with at least one of no liquid, a nominal amount of liquid, and liquid in excess of the nominal amount detected on the windshield 102 by the sensor 264. A nominal amount of liquid detected on the windshield 102, carried by the airflow path across the exterior surface 120 of the vehicle 100, does not cause liquid to overflow from the windshield 102 to the first side window 110. As such, an amount of liquid in excess of the nominal amount of liquid on the windshield 102 results in liquid from the windshield 102 carried by the airflow path to overflow to the first side window 110.

An inflated condition of the bladder 250 corresponding with the inflated position of the cover 344 is a nominal high pressure condition of the bladder 250. The controller 262 is configured to actuate the air pump 254 and the valve 260 to bring the bladder 250 into the inflated condition when input from the sensor 264 to the controller 262 corresponds with no liquid, or no more than a nominal amount of liquid on the windshield 102. A deflated condition of the bladder 250 corresponding with the deflated position of the cover 344 is a low pressure condition relative to the inflated condition of the bladder, and corresponds with liquid in excess of the nominal amount detected on the windshield by the sensor.

Figure 8:
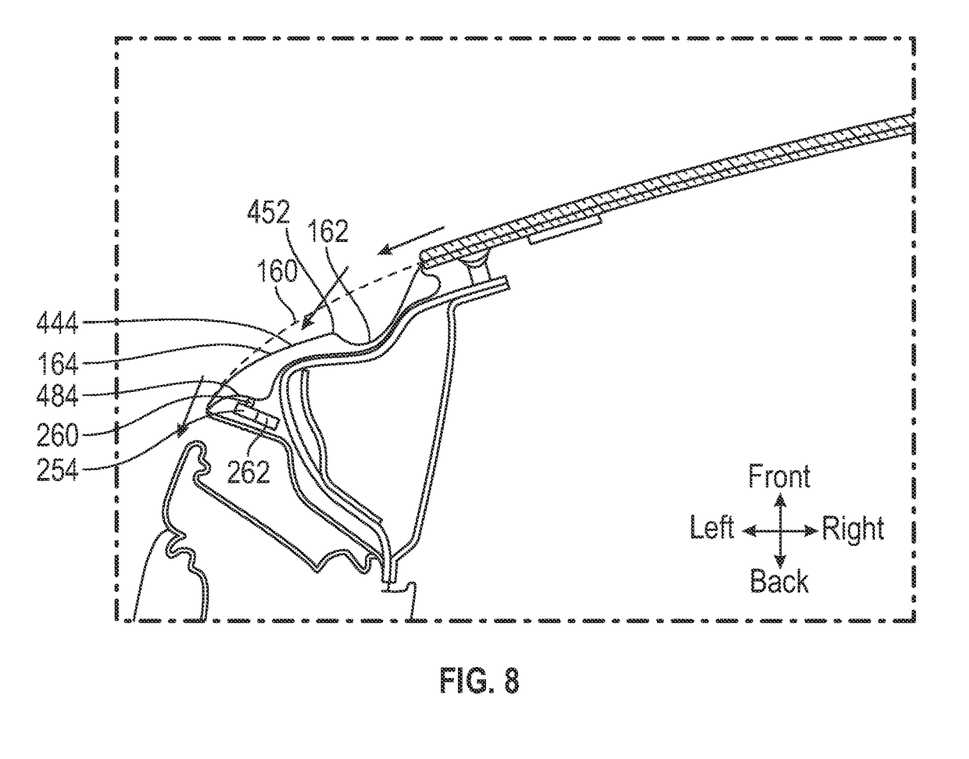
FIG. 8 is a cross-sectional view of an embodiment of the first gutter surface assembly featuring a bladder at least partially formed from a cover.

In an alternative embodiment, a cover disposed over the first A-pillar 104 at least partially forms a bladder. To this end, FIG. 8 depicts a cover 444 disposed over the first A-pillar 104 where the cover 444 at least partially forms a bladder 484 supported on the first A-pillar 104. Unless otherwise stated, the cover 444 and the bladder 484 respectively operate in a similar manner as described with reference to the cover 244 and the bladder 250, and respectively have similar features as the cover 244 and the bladder 250. With this construction, the controller 262 actuates the air pump 254 and the valve 260 to inflate and deflate the bladder 484, including the cover 444, between the deflated condition and an inflated condition, so as to respectively support the cover 444 in the inflated position and the deflated position.

A molded shape and material thickness of the cover 444 define the living hinge 452 in the cover 444 located between and connecting the gutter surface 162 and the flow re-attachment surface 164 when the cover 444 is in the deflated position. The living hinge 452 is bent inward along the exterior surface 120 of the vehicle 100 in the left-right direction of the vehicle 100, between the gutter surface 162 and the flow re-attachment surface 164, to form the concavity defined in the gutter surface 162.

A method of operating the first gutter surface assembly 140 includes elastically deforming the cover 144 to the deflated position in response to one of a user command and an input from the sensor 264, the cover 144 being disposed over the first A-pillar 104 such that the cover 144 at least partially forms the exterior surface 120 of the vehicle 100 at a location that is interposed between and separates the windshield 102 and the first side window 110 in the right-left direction of the vehicle 100, with the first lateral side 150 of the cover 144 located closer to the first side window 110 as compared to the windshield 102 and the second lateral side 152 of the cover 144 located closer to the windshield 102 as compared to the first side window 110. In the method, when the cover 144 is in the deflated position the cover 144 forms the gutter surface 162 in the second lateral side 152 of the cover 144 and the flow re-attachment surface 164 in the first lateral side 150 of the cover 144. The gutter surface 162 separates the airflow path of the vehicle 100 from the exterior surface 120 of the vehicle 100 and collects liquid traveling with the airflow path between the windshield 102 and the first side window 110 in the right-left direction of the vehicle 100, the gutter surface 162 being disposed along the windshield 102, between the windshield 102 and the flow re-attachment surface 164 in the right-left direction of the vehicle 100. The flow re-attachment surface 164 re-attaches the airflow path to the exterior surface 120 of the vehicle 100, the flow re-attachment surface 164 being disposed along the first side window 110, between the gutter surface 162 and the first side window 110 in the right-left direction of the vehicle 100.

In an embodiment, the method includes elastically deforming the cover 244 to an inflated position in response to one of another user command and another input from the sensor 264 indicating liquid on the windshield 102. When the cover 244 is in the inflated position the cover 244 forms the contour 270, including the ridge 272 where the exterior surface 120 of the vehicle 100 is extended outward. The cover 244 is disposed along the windshield 102, between the windshield 102 and the first side window 110 in the right-left direction of the vehicle 100 such that the contour 270 directs the airflow path away from the exterior surface 120 of the vehicle 100 before the airflow path reaches the first side window 110 and the airflow path deflects liquid traveling with the airflow path away from the first side window 110 in the right-left direction of the vehicle 100.

In an embodiment, the method includes elastically deforming the cover 344 to an inflated position in response to one of another user command and another input from the sensor 264 indicating no liquid is detected on the windshield 102. When the cover 344 is in the inflated position the exterior surface 120 of the vehicle 100 formed from the cover 344 substantially conforms to the aerodynamic shape 160 in accordance with the airflow path such that the airflow path is attached to the exterior surface 120 of the vehicle 100 from the windshield 102 to the first side window 110 across the cover 344 in the right-left direction of the vehicle 100.

It will be appreciated that various embodiments of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. An A-pillar surface of a vehicle, the A-pillar surface comprising:
   a cover disposed over an A-pillar such that the cover at least partially forms an exterior surface of the vehicle and defines an airflow path along the exterior surface of the vehicle at a location that is interposed between and separates a windshield and a side window of the vehicle;
   wherein the cover includes an outer surface extended between a first lateral side and a second lateral side of the cover, the first lateral side is located closer to the side window as compared to the windshield and is fixed to the A-pillar, the second lateral side is located closer to the windshield as compared to the side window and is fixed to the windshield,
   wherein the outer surface of the cover forms both a flow re-attachment surface disposed along the side window to partially define the airflow path, and a gutter surface disposed along the windshield and recessed from the airflow path and into the exterior surface of the vehicle between the windshield and the flow re-attachment surface at the exterior surface of the vehicle such that the gutter surface is configured to collect liquid traveling with the airflow path from the windshield to the side window.

2. The A-pillar surface according to claim 1, wherein the cover is elastically deformable between a deflated position and an inflated position,
   wherein when the cover is in the inflated position, the cover forms a contour that includes a ridge extended outward from the exterior surface of the vehicle and is disposed along the windshield, between the windshield and the side window along the exterior surface of the vehicle, and the contour is configured to separate the airflow path from the exterior surface of the vehicle before the airflow path reaches the side window such that the airflow path deflects liquid traveling with the airflow path away from the side window in the lateral direction of the vehicle.

3. The A-pillar surface according to claim 2, wherein the exterior surface of the vehicle is at least partially formed by the windshield, the cover, and the side window in the lateral direction of the vehicle,
   wherein the exterior surface of the vehicle formed from the windshield and the side window defines the airflow path and is configured to facilitate attachment of the airflow path to the exterior surface of the vehicle, and
   wherein when the cover is in the inflated position, the contour forms the ridge extended outward from the vehicle such that the contour substantially deviates outward from the exterior surface of the vehicle at the windshield and the side window, and the ridge is configured to separate airflow from the exterior surface of the vehicle.

4. The A-pillar surface according to claim 3, wherein when the cover is in the inflated position, the contour includes a recess along the windshield, between the windshield and the ridge in the lateral direction of the vehicle such that the contour substantially deviates inward from the exterior surface of the vehicle at the windshield.

5. The A-pillar surface according to claim 2, further comprising:
   a bladder disposed on the A-pillar and under the cover with respect to the exterior surface of the vehicle,
   wherein the bladder is configured for being inflated to support the cover in the inflated position, and the bladder is configured for being deflated to retract the cover inward with respect to the exterior surface of the vehicle, toward the deflated position from the inflated position, and support the cover in the retracted position.

6. The A-pillar surface according to claim 2, further comprising a controller configured to actuate an air pump and cause the cover to elastically deform into one of the deflated position and the inflated position in response to a user command.

7. The A-pillar surface according to claim 2, further comprising a controller configured to actuate an air pump and cause the cover to elastically deform into one of the deflated position and the inflated position in response to input from a sensor configured to detect liquid on the windshield.

8. The A-pillar surface according to claim 1
   wherein the first lateral side of the cover is fixed to a lateral side of the A-pillar located closer to the side window as compared to the windshield, and the second lateral side of the cover is fixed with the windshield at a location closer to the windshield as compared to the side window.

9. The A-pillar surface according to claim 1,
   wherein the flow re-attachment surface is formed in the first lateral side of the cover and the gutter surface is formed in the second lateral side of the cover.

10. The A-pillar surface according to claim 1, wherein the exterior surface of the vehicle is at least partially formed by the windshield, the cover, and the side window in the lateral direction of the vehicle,
  wherein the exterior surface of the vehicle formed from the windshield and the side window defines the airflow path and is configured to facilitate attachment of the airflow path to the exterior surface of the vehicle,
  wherein the exterior surface of the vehicle formed from the cover substantially deviates from the exterior surface of the vehicle at the windshield such that the gutter surface is configured to separate the airflow path from the exterior surface of the vehicle, and
  wherein at least a portion of the flow re-attachment surface forming the exterior surface of the vehicle substantially conforms to the exterior surface of the vehicle at the side window such that the flow re-attachment surface is positioned to receive the airflow path and the airflow path is re-attached to the exterior surface of the vehicle at the flow re-attachment surface.

11. The A-pillar surface according to claim 1, further comprising:
  a bladder disposed on the A-pillar, the bladder being at least partially formed from the cover,
  wherein the cover is elastically deformable between a deflated position and an inflated position, and
  wherein the bladder is configured for being inflated to support the cover in the inflated position, and the bladder is configured for being deflated to retract the cover inward toward the deflated position from the inflated position and support the cover in the retracted position.

12. An A-pillar surface of a vehicle, the A-pillar surface comprising:
  a cover disposed over an A-pillar such that the cover at least partially forms an exterior surface of the vehicle with a windshield and a side window at a location that is interposed between and separates the windshield and the side window along the exterior surface of the vehicle, the cover being elastically deformable between an inflated position and a deflated position,
  wherein the cover includes an outer surface extended between a first lateral side and a second lateral side of the cover, the first lateral side is located closer to the side window as compared to the windshield and is fixed to the A-pillar, the second lateral side is located closer to the windshield as compared to the side window and is fixed to the windshield,
  wherein when the cover is in the inflated position, the exterior surface of the vehicle formed from the cover substantially conforms to the exterior surface of the vehicle formed from the windshield and the side window such that an airflow path is attached to the exterior surface of the vehicle from the windshield to the side window across the cover, and
  wherein when the cover is in the deflated position, the outer surface of the cover forms both a gutter surface in the second lateral side of the cover and a flow re-attachment surface in the first lateral side of the cover such that:
    the gutter surface is recessed inward of an exterior surface of the windshield and is disposed along the windshield, between the windshield and the flow re-attachment surface in the lateral direction of the vehicle, the gutter surface being configured to separate the airflow path from the exterior surface of the vehicle and collect liquid traveling with the airflow path between the windshield and the side window, and
    the flow re-attachment surface is disposed along the side window, between the gutter surface and the side window along the exterior surface of the vehicle, and the flow re-attachment surface is positioned to receive the airflow path such that the airflow path re-attaches to the exterior surface of the vehicle at the flow re-attachment surface.

13. The A-pillar surface according to claim 12, wherein the exterior surface of the vehicle is at least partially formed by the windshield, the cover, and the side window in the lateral direction of the vehicle,
  wherein the exterior surface of the vehicle formed from the windshield and the side window defines the airflow path and is configured to facilitate attachment of the airflow path to the exterior surface of the vehicle,
  wherein when the cover is in the deflated position, the gutter surface substantially deviates inward from the exterior surface of the vehicle at the windshield such that the gutter surface is configured to separate the airflow path from the exterior surface of the vehicle, and
  wherein when the cover is in the deflated position, at least a portion of the flow re-attachment surface forming the exterior surface of the vehicle is positioned to receive the airflow path such that the airflow path re-attaches to the exterior surface of the vehicle at the flow re-attachment surface.

14. The A-pillar surface according to claim 12, further comprising:
  a bladder disposed on the A-pillar and under the cover with respect to the exterior surface of the vehicle,
  wherein the bladder is configured for being inflated to support the cover in the inflated position, and the bladder is configured for being deflated to retract the cover inward toward the deflated position from the inflated position and support the cover in the deflated position.

15. The A-pillar surface according to claim 12, further comprising:
  a bladder supported by the A-pillar, the bladder being at least partially formed from the cover,
  wherein the bladder is configured for being inflated to support the cover in the inflated position, and the bladder is configured for being deflated to retract the cover inward toward the deflated position from the inflated position and support the cover in the deflated position.

16. The A-pillar surface according to claim 12, further comprising a controller configured to actuate an air pump and cause the cover to elastically deform into one of the deflated position and the inflated position in response to at least one of a user command and an input from a sensor configured to detect liquid on the windshield.

17. A method of operating an A-pillar surface of a vehicle, the method comprising:
  elastically deforming a cover to a deflated position in response to one of a user command and a sensor input indicating liquid on a windshield, the cover being disposed over an A-pillar such that the cover at least partially forms an exterior surface of the vehicle with the windshield and a side window at a location that is interposed between and separates the windshield and the side window in a lateral direction of the vehicle, with a first lateral side of the cover located closer to the side window as compared to the windshield and fixed to the A-pillar and a second lateral side of the cover located closer to the windshield as compared to the side window and fixed to the windshield, wherein when the cover is in the deflated position an outer surface of the cover forms both a gutter surface in the second lateral side of the cover that is recessed inward of exterior surface of the windshield and a flow re-attachment surface on the first lateral side of the cover such that:

the gutter surface separates an airflow path from the exterior surface of the vehicle and collects liquid traveling with the airflow path between the windshield and the side window in the lateral direction of the vehicle, the gutter surface being disposed along the windshield, between the windshield and the flow re-attachment surface in the lateral direction of the vehicle, and the flow re-attachment surface is positioned to receive the airflow path such that the airflow path re-attaches to the exterior surface of the vehicle at the flow re-attachment surface, the flow re-attachment surface being disposed along the side window, between the gutter surface and the side window in the lateral direction of the vehicle.

18. The method of claim 17, further comprising elastically deforming the cover to an inflated position in response at least one of another user command and another sensor input indicating no liquid on the windshield, wherein when the cover is in the inflated position the exterior surface of the vehicle formed from the cover substantially conforms to the exterior surface of the vehicle at the windshield and the side window such that the airflow path is attached to the exterior surface of the vehicle from the windshield to the side window across the cover in the lateral direction of the vehicle.

19. The method of claim 17, further comprising:

elastically deforming the cover to an inflated position in response to at least one of another user command and another sensor input indicating liquid on the windshield, wherein when the cover is in the inflated position the cover forms a contour that includes a ridge extended outward from the exterior surface of the vehicle and is disposed along the windshield, between the windshield and the side window in the lateral direction of the vehicle such that the contour directs the airflow path away from the exterior surface of the vehicle before the airflow path reaches the side window and the airflow path deflects liquid traveling with the airflow path away from the side window in the lateral direction of the vehicle.

* * * * *